US008996033B1

(12) United States Patent
Xu et al.

(10) Patent No.: US 8,996,033 B1
(45) Date of Patent: *Mar. 31, 2015

(54) SYSTEMS AND METHODS FOR STATISTICALLY ASSOCIATING MOBILE DEVICES TO HOUSEHOLDS

(71) Applicant: 4INFO, Inc., San Mateo, CA (US)

(72) Inventors: Yonggang Xu, San Jose, CA (US); Tim Jenkins, San Jose, CA (US)

(73) Assignee: 4INFO, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,258

(22) Filed: Oct. 3, 2014

Related U.S. Application Data

(63) Continuation of application No. 14/222,008, filed on Mar. 21, 2014, now Pat. No. 8,880,097, which is a continuation of application No. 14/096,597, filed on Dec. 4, 2013, now Pat. No. 8,792,909.

(51) Int. Cl.
*H04W 24/00* (2009.01)
*G06Q 30/02* (2012.01)
*H04W 4/02* (2009.01)

(52) U.S. Cl.
CPC .......... *G06Q 30/0261* (2013.01); *H04W 4/02* (2013.01)
USPC ................................................... 455/456.1

(58) Field of Classification Search
USPC ............ 455/456.1, 456.6, 418; 707/749, 738, 707/737
See application file for complete search history.

(56) References Cited

U.S. PATENT DOCUMENTS

| | | | |
|---|---|---|---|
| 2008/0243815 A1* | 10/2008 | Chan et al. ................... | 707/5 |
| 2008/0263042 A1* | 10/2008 | Li et al. ....................... | 707/7 |
| 2011/0137921 A1* | 6/2011 | Inagaki ........................ | 707/749 |
| 2012/0239504 A1 | 9/2012 | Curlander et al. | |
| 2013/0093869 A1 | 4/2013 | Inagawa et al. | |
| 2013/0345957 A1* | 12/2013 | Yang et al. ................... | 701/300 |

OTHER PUBLICATIONS

Anderson et al., "Marketing the downtown through geographically enhanced consumer segmentation," Journal of Place Management and Development, (2009), vol. 2 No. 2, pp. 125-139.
Conitzer et al., "Common Voting Rules as Maximum Likelihood Estimators," In Uncertainty in Artificial Intellgence: Proceedings of the Twentieth Conference, (2005), pp. 145-152.
Pham et al., "Selection of K in K-means clustering,". Proceedings of the Institution of Mechanical Engineers, Part C: Journal of Mechanical Engineering Science Jan. 1, 2005, vol. 219, No. 1, pp. 103-119.

* cited by examiner

*Primary Examiner* — Kiet Doan
(74) *Attorney, Agent, or Firm* — Goodwin Procter LLP

(57) ABSTRACT

Embodiments of the invention relate to methods and systems for associating a mobile device to a household. In various embodiments, a plurality of latitude-longitude pairs is received for a mobile device during a time period. The latitude-longitude pairs are organized into a plurality of clusters corresponding to geographic regions visited by the mobile device during the time period. For each cluster, a score is calculated that represents a likelihood that a user of the mobile device resides in a household within the cluster. The cluster with the highest score is identified as being the location of the user's household. The computation is preferably conducted recursively over time periods. The mobile device is then associated with the user's household.

22 Claims, 11 Drawing Sheets

SYSTEMS AND METHODS FOR STATISTICALLY ASSOCIATING MOBILE DEVICES TO HOUSEHOLDS

CROSS-REFERENCE TO RELATED APPLICATIONS

This application is a continuation application of U.S. patent application Ser. No. 14/222,008, filed Mar. 21, 2014, the entire contents of which are incorporated by reference herein, which is a continuation of U.S. patent application Ser. No. 14/096,597, filed Dec. 4, 2013, the entire contents of which are incorporated by reference herein.

FIELD OF THE INVENTION

Aspects of the invention are generally related to advertising on mobile devices, and, more specifically, to statistically associating a mobile device to a household and using household segmentation information to deliver targeted interactive advertisements to mobile devices.

BACKGROUND OF THE INVENTION

The proliferation of the World Wide Web, and, more recently, the ability to view information from the Web using wireless, hand-held devices, has significantly increased consumers' ability to access the Web from almost anywhere. Consumers use these devices to view and interact with content such as general news, sports, and business, as well as use the devices to create user-generated content through social media sites, photo-sharing sites, and others. Consumers also are increasingly using their devices for transactional purposes—buying movie tickets, paying for meals, or purchasing goods and services. Essentially, mobile, Web-enabled smart-phones, tablets and similar devices have taken the place of the desktop computer, telephone, and credit card as the advertising platform and point-of-sale of choice.

This presents a bit of a challenge for advertisers, ad networks, content providers, and other members of the so-called "advertising ecosystem." In the past, advertisers relied on certain known data about consumers—whether it be personal information provided by the consumer, data representing prior interactions with an online retail store, or data collected as the consumer navigated across the Web. All of this data was easily available and could be tied directly to a person, and, if the individual provided additional data, could be combined with demographic data, thus building a particular user profile. This resulted in more effective ad targeting.

Providing targeted ads has been beneficial to both the advertiser and the consumer. For example, in an advertising context, both the advertiser and the consumer benefit from targeted ads; the consumer receives ads that are relevant to his or her interests and the advertiser gets improved response to those targeted ads (e.g., a higher "lift"). But, as described above, in order to provide targeted content, the provider must both possess and effectively utilize information about the recipient; and further, the provider must also possess and effectively utilize information about the content that is being delivered. This is a challenge when delivering ads to mobile devices.

Certain mobile software applications and websites provide interactive advertisement slots of various formats. Typically, an advertisement request is sent from the mobile device directly or indirectly to one or more ad servers, e.g., when the user's mobile device browser or application requests an ad from an ad server, or a publisher system makes such a request on behalf of the user. In some cases, intermediate advertising networks may manage the allocation of advertising content to advertising slots (sometimes referred to as "inventory") based on economic and other terms. The advertisement request may contain a suite of information fields such as a unique identifier call device ID, the time when request is initiated, and the geo-location of the device initiating the request. From those fields, additional information can be derived, for example, the local time when the request is initiated. The ad server (or ad network) makes a real-time decision on ad serving based on information contained in the ad request.

Demographically targeted advertising has been instrumental in improving the efficiency of advertising campaigns. For example, market research firms gather and analyze data regarding consumers, products, purchase histories, survey results, and other information to define marketing segments, sometimes even at the household level. For example, a list of households may be created that identifies families that are likely to purchase a certain type of car, and the automobile company may send mailings to this segmented list in an attempt to sell more cars. This approach does not translate well into the mobile advertising space, however. First, advertising companies do not have access to mobile subscriber data, as the network providers do not share address and personal data associated with a particular number or device. Second, the mobile device moves among various locales over time and cannot be immediately associated to a particular household.

Mobile display advertising has become an area of huge growth in recent years. While the advertising volume delivered via mobile devices has increased drastically, overall mobile advertising revenue continues to lag due in part to lack of effective targeting. One of the biggest challenges for advertisers and publishers on the mobile advertising platforms is that they are not able to identify content requests that come from members of their "target" audience. There are two primary reasons for this shortfall. First, while many brands and advertisers have access to the registration and purchase history information they collect about their customers, they have no way to associate mobile users with various demographic and audience segments. Second, while many third party data aggregation and analytics companies collect consumers' purchase behavior and other information at a household level, they do not know which mobile devices belong to a particular household.

Therefore, there is a need for a comprehensive platform that can bring together consumers' online and offline purchase behavior and demographic data to build audience segments, and tie mobile devices to the segments such that ads can be delivered to mobile devices that belong to the households identified as high-lift segments.

SUMMARY OF THE INVENTION

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

Methods and supporting systems for statistically associating a mobile device to a household are provided using a suite of machine learning technologies and data analytics. In general, signals about a device's location are received from devices over time and modeled as a random time-series of latitude-longitude pairs with uncertainties (e.g., due to inaccuracies associated with measuring the device's location). Household addresses are geo-coded to a latitude and longitude pair, and randomly coded into a household ID. Statistical learning methods and computational algorithms associate a device ID to a household ID.

In one aspect, the invention relates to a method of associating a mobile device (e.g., a cellular phone, a portable computing device, or a tablet computer) to a household. The method includes: receiving a plurality of latitude-longitude pairs for a mobile device, the latitude-longitude pairs corresponding to a location of the mobile device during a time period (e.g., an hour, a day, a week, or a month); organizing the plurality of latitude-longitude pairs into a plurality of clusters, the clusters corresponding to geographic regions visited by the mobile device during the time period; calculating a score for each cluster, the score representing a likelihood that a user of the mobile device resides in a household within the cluster; identifying a location of the user's household, the location corresponding to the cluster having the highest score; and associating the mobile device with the user's household.

In certain embodiments, the latitude-longitude pairs are obtained using global positioning with a global positioning system, cellular triangulation, and/or WiFi identification. The latitude-longitude pairs may be associated with an ad request sent by the mobile device. In one embodiment, calculating the score includes applying a weight based on at least one of a time and a location associated with a longitude-latitude pair. For example, the weight may be based on the time associated with the latitude-longitude pair, according to a likelihood that the mobile device was in the household at the time. In some embodiments, the weight is based on the location associated with the latitude-longitude pair, according to a likelihood that the location corresponds to a residential location. The method may also include rejecting a latitude-longitude pair based on an indication that the latitude-longitude pair is erroneous.

In various embodiments, the method further includes: receiving, during a second time period, a plurality of second latitude-longitude pairs for the mobile device, the second latitude-longitude pairs corresponding to a location of the mobile device during the second time period; organizing the plurality of second latitude-longitude pairs into a plurality of second clusters, the second clusters corresponding to geographic regions visited by the mobile device during the second time period; calculating a second score for each second cluster, the second score representing a likelihood that the user of the mobile device resides in a household within the second cluster; and identifying a second location of the user's household, the second location corresponding to the second cluster having the highest second score.

In some embodiments, the method includes performing a state update, which includes: determining whether the location of the user's household and the second location of the user's household are consistent; if the location and the second location are consistent, determining a revised location of the user's household as a function of the location and the second location; if (i) the location and the second location are not consistent, and (ii) the highest second score is less than or equal to the highest score, associating the mobile device with the location; and if (i) the location and the second location are not consistent, and (ii) the highest second score is greater than the highest score, associating the mobile device with the second location of the user's household. The method may include assigning statistical metrics to measure fitness of the device ID and household ID association.

In another aspect, the invention relates to a system for associating a mobile device to a household. The system includes a data storage device operating on a server computer and storing a plurality of latitude-longitude pairs for a mobile device (e.g., a cellular phone, a portable computing device, or a tablet computer). The latitude-longitude pairs correspond to a location of the mobile device during a time period (e.g., an hour, a day, a week, or a month). The system also includes a processor for executing computer-readable instructions that, when executed: organize the plurality of latitude-longitude pairs into a plurality of clusters, the clusters corresponding to geographic regions visited by the mobile device during the time period; calculate a score for each cluster, the score representing a likelihood that a user of the mobile device resides in a household within the cluster; identify a location of the user's household, the location corresponding to the cluster having the highest score; and associate the mobile device with the user's household.

In certain embodiments, the latitude-longitude pairs are obtained using global positioning with a global positioning system, cellular triangulation, and/or WiFi identification. The latitude-longitude pairs may be associated with an ad request sent by the mobile device. In some embodiments, calculating the score includes applying a weight based on at least one of a time and a location associated with a longitude-latitude pair. For example, the weight may be based on the time associated with the latitude-longitude pair, according to a likelihood that the mobile device was in the household at the time. In one embodiment, the weight is based on the location associated with the latitude-longitude pair, according to a likelihood that the location corresponds to a residential location. The computer-readable instructions, when executed, may further reject a latitude-longitude pair based on an indication that the latitude-longitude pair is erroneous.

In certain embodiments, the computer-readable instructions, when executed: receive, during a second time period, a plurality of second latitude-longitude pairs for the mobile device, the second latitude-longitude pairs corresponding to a location of the mobile device during the second time period; organize the plurality of second latitude-longitude pairs into a plurality of second clusters, the second clusters corresponding to geographic regions visited by the mobile device during the second time period; calculate a second score for each second cluster, the second score representing a likelihood that the user of the mobile device resides in a household within the second cluster; and identify a second location of the user's household, the second location corresponding to the second cluster having the highest second score.

In various embodiments, the computer-readable instructions, when executed, perform a state update that includes: determining whether the location of the user's household and the second location of the user's household are consistent; if the location and the second location are consistent, determining a revised location of the user's household as a function of the location and the second location; if (i) the location and the second location are not consistent, and (ii) the highest second score is less than or equal to the highest score, associating the mobile device with the location; and if (i) the location and the second location are not consistent, and (ii) the highest second score is greater than the highest score, associating the mobile device with the second location of the user's household. The computer-readable instructions, when executed, may assign statistical metrics to measure fitness of the device ID and household ID association.

In another aspect, the invention relates to a computer program product embodied on a computer-readable medium and including computer code for associating a mobile device to a household. The code includes instructions for: receiving a plurality of latitude-longitude pairs for a mobile device, the latitude-longitude pairs corresponding to a location of the mobile device during a time period; organizing the plurality of latitude-longitude pairs into a plurality of clusters, the clusters corresponding to geographic regions visited by the mobile device during the time period; calculating a score for each cluster, the score representing a likelihood that a user of the mobile device resides in a household within the cluster; identifying a location of the user's household, the location corresponding to the cluster having the highest score; and associating the mobile device with the user's household.

In other embodiments, latitude-longitude pairs are classified, based on which records with erroneous latitude-longitude are filtered out. A global profile is built for all the latitude-longitude pairs received by the platform and a global list is maintained of erroneous latitude-longitude pairs. The aforementioned list is used against records from all devices and may be used to identify erroneous latitude-longitude pairs received at a later time. A device level profile is built to detect and reject inconsistent latitude-longitude pairs.

In still other embodiments, data are partitioned according to device IDs so that computation can be performed on any configurable number of computer nodes, and each node only processes a subset of device IDs.

In still other embodiments, all latitude-longitude pairs are clustered into a certain number of clusters adaptively, so that each cluster is of a certain size or smaller. Recursive computation is devised so that the optimal number of clusters is reached.

In still other embodiments, each cluster of latitude-longitude pairs is assigned with a score that measures a likelihood of containing the device's home address. The score incorporates factors such as number of ad requests, time of the requests, and spread of households in the neighboring area.

It is to be understood that both the foregoing general description and the following detailed description are exemplary and explanatory only and are not restrictive of the invention, as claimed.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

DESCRIPTION OF THE EMBODIMENTS

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

Throughout the description, where apparatus and systems are described as having, including, or comprising specific components, or where processes and methods are described as having, including, or comprising specific steps, it is contemplated that, additionally, there are apparatus and systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

Embodiments of the invention provide methods and supporting systems to statistically associate a mobile device to a household, using a suite of machine-learning technologies and data analytics. In general, signals about a device's location are received from devices over time and modeled as a random time-series of latitude-longitude pairs with uncertainties. Household addresses are geo-coded to a latitude and longitude pair, and randomly coded into a household ID. Statistical learning methods and computational algorithms are used to associate a device ID to a household ID.

Figure 1:
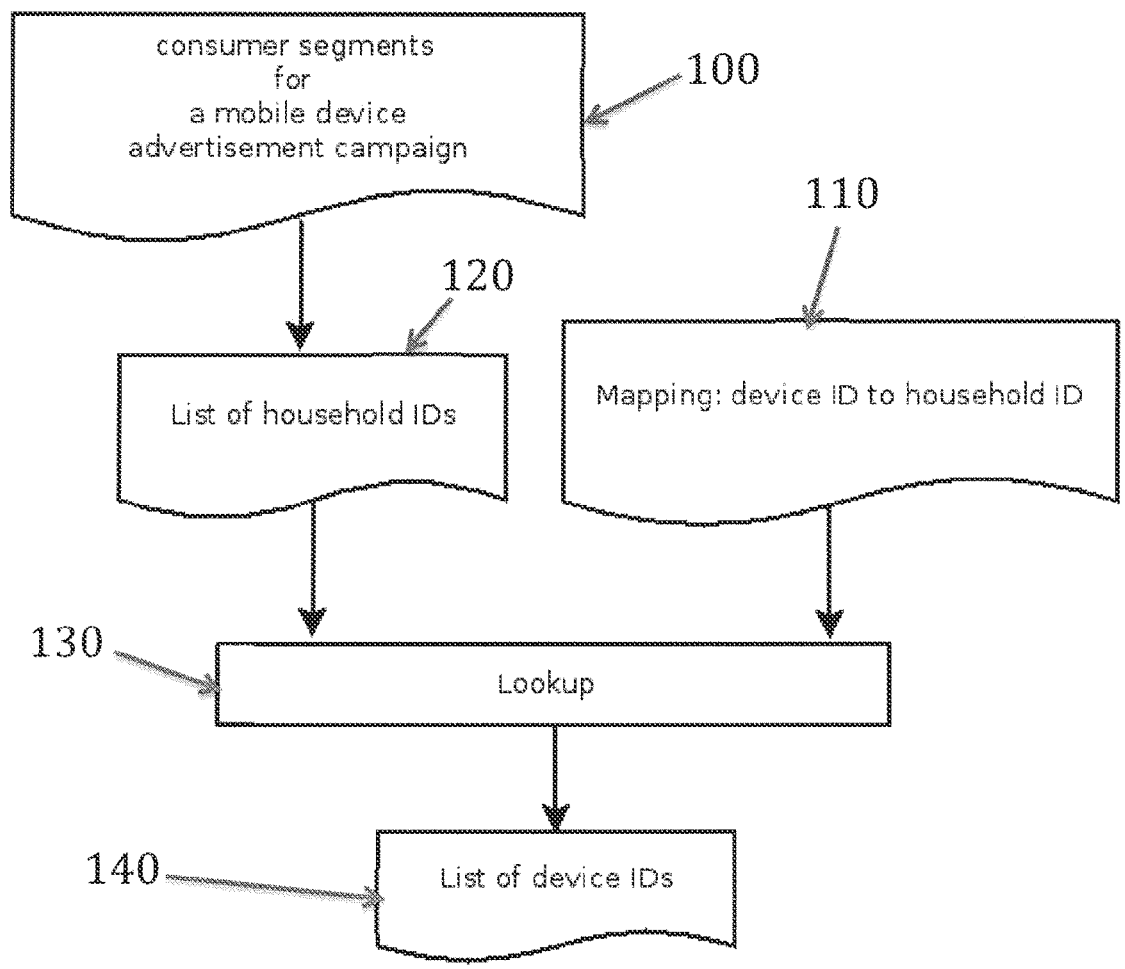
FIG. 1 is a schematic block diagram of a system for associating mobile device ID to household ID, for use in targeted mobile advertising, consistent with an embodiment of the present invention.

FIG. 1 shows a mobile advertisement campaign 100 targeted at household segments. A device ID to household ID mapping 110 is an output from a device-household association platform. The campaign 100 has a list of targeting household IDs 120, which is generally the same list that would be used for an advertisement campaign delivered by ground mail. A computer program 130 looks up the list against the association mapping 110 to obtain a list of device IDs 140 associated with the household IDs 120. An ad may make use of the list of device IDs 140 to fulfill advertisement to ad requests with matching device IDs. In that way, targeted advertisements can be delivered on mobile devices to desirable segments associated with the households.

Figure 2:
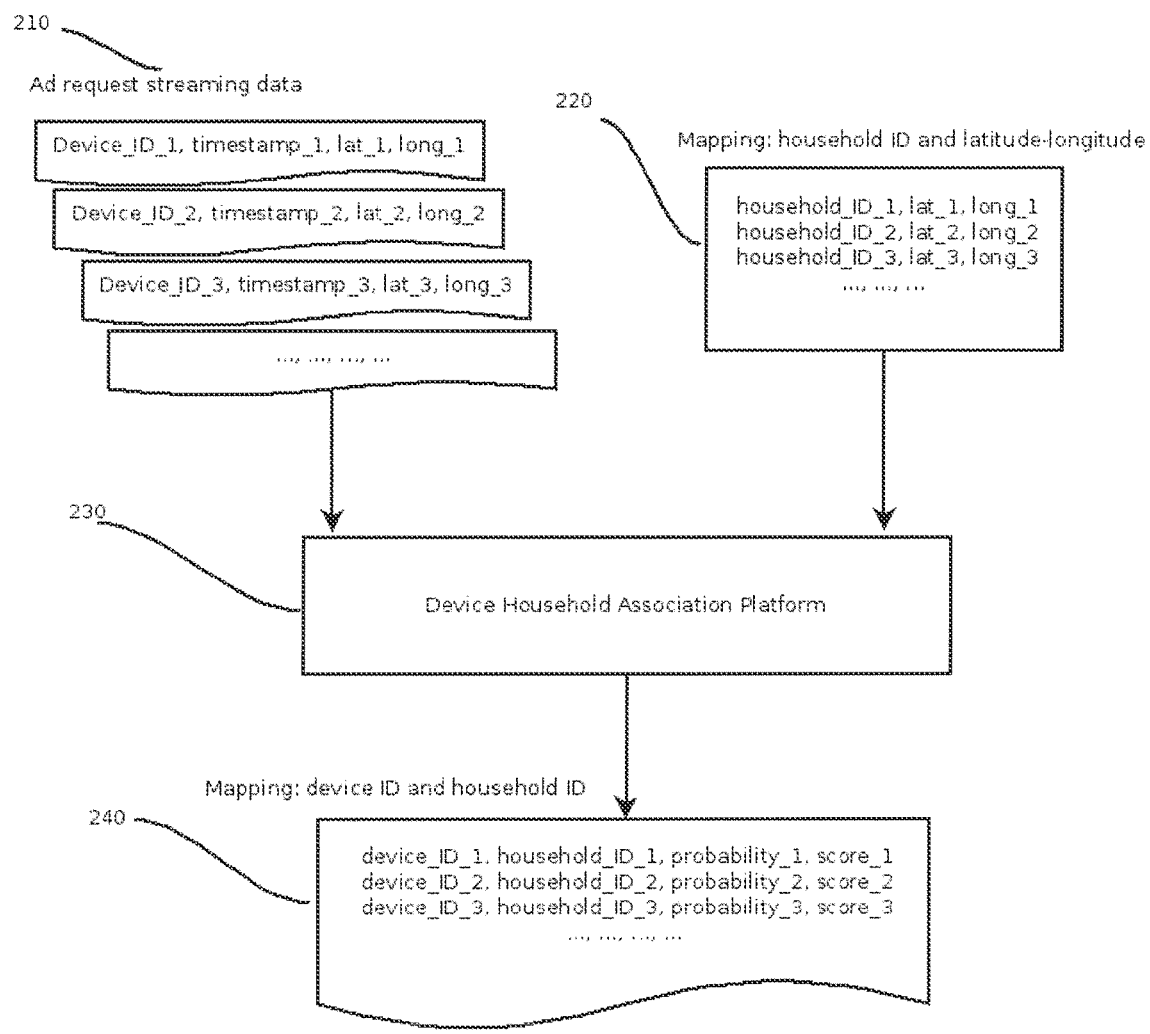
FIG. 2 is a schematic block diagram of input and output to a device-household association platform, consistent with an embodiment of the present invention.

FIG. 2 shows the input and output of a device household association platform 230. The input includes a time series of ad requests 210 and a mapping 220 from a household ID to its location as a latitude-longitude pair. The ad request time series 210 may contain many pieces of information about the request. For example, it may contain location information represented as a latitude-longitude 2-tuple. It also contains timestamp at which the ad request is initiated. Additional information may also be derived, as one skilled in the art can see, such as a local time when the request is initiated. In the depicted embodiment, the ad request streaming data 210 shows only a subset of those fields. The mapping 220 from household ID to latitude-longitude pair may be obtained through a process called geocoding. A selection of public or proprietary databases is available to translate a household address to a latitude-longitude pair corresponding to a location on the street or a point at rooftop. Multiple household IDs may be geocoded to the same latitude-longitude pair, e.g., for the case of a high-rise residential building or an apartment building. The household addresses are anonymized as household IDs. To simplify presentation, a device ID is said to be associated with a household ID even though the device ID may be associated to a plurality of household IDs, e.g., because the household IDs are geocoded to the same latitude-longitude.

Also shown in FIG. 2 is an output 240 of the device household platform 230. The output 240 may be represented in tabular form with each row containing a device ID, a matching household ID, and statistical properties. The statistical properties may include: (1) probability of the device ID being associated to the household ID; (2) a score that measures how strong the evidence is about the association; and/or (3) a total number of ad requests related to this association.

The latitude-longitude information may be from different sources, e.g., a global positioning system (GPS), cellular triangulation, and/or WiFi identification, and the latitude-longitude information may correspond to different precisions and accuracies. It may also happen that some of the latitude-longitude pairs are not true at all. In some embodiments, latitude-longitude pairs are classified so as to identify the erroneous ones, and corresponding records are excluded from further computation. This classification may be performed at two levels: the system level and the device level, respectively.

Figure 3:
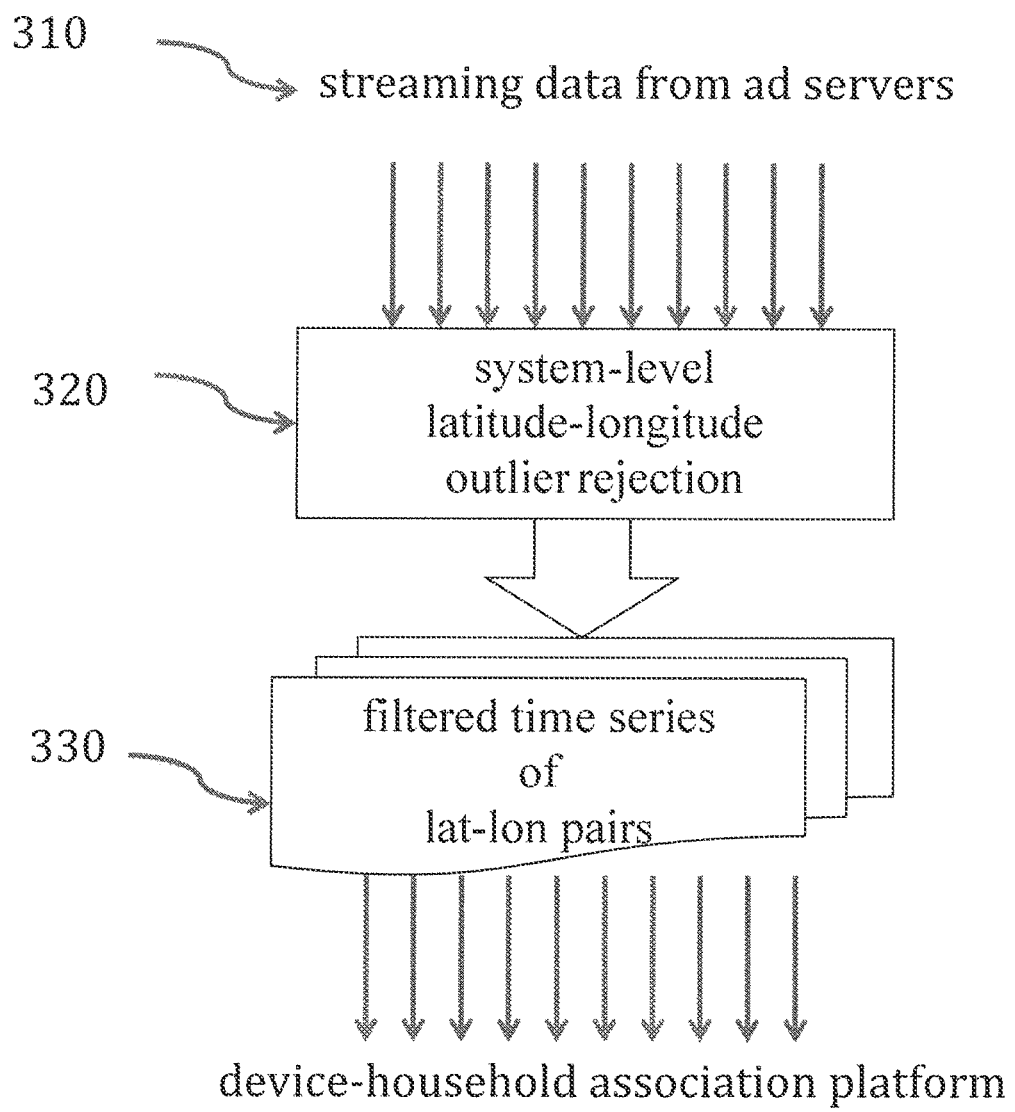
FIG. 3 is a schematic diagram of system-level latitude-longitude outlier rejection module, consistent with an embodiment of the present invention.

FIG. 3 shows a system level outlier data rejection unit 320 receiving streaming data 310 from ad servers, in accordance with certain embodiments of the invention. Latitude-longitude pairs are classified by a score that is recursively computed based on the frequencies at which the latitude-longitude pairs appear. Some latitude-longitude pairs appear millions of time a day in all ad requests. Such latitude-longitude pairs may be a geographic center of a country or a city that programmers code into and they do not represent a true location of a device. Supervised learning algorithms are applied to build a global list of latitude-longitude outliers, against which the outlier data rejection unit 320 filters out corresponding ad requests, to obtain a filtered time series of latitude-longitude pairs 330. The list of latitude-longitude outliers may be used to identify erroneous or outlier latitude-longitude pairs received at a later time.

Figure 4:
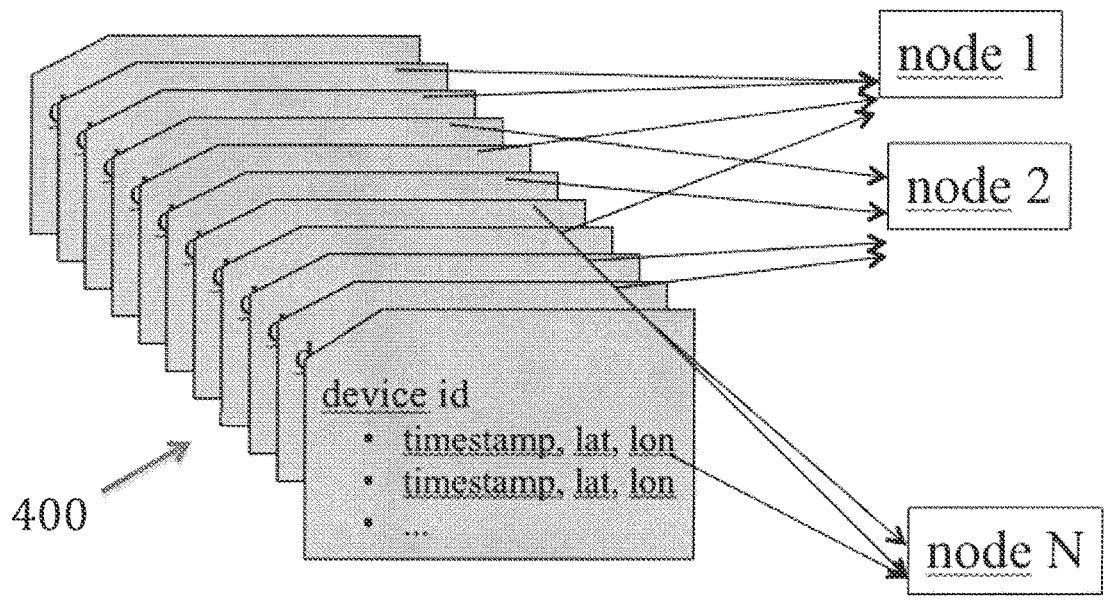
FIG. 4 is a schematic diagram of input data being partitioned according to device ID, so that the data may be processed by a configurable number of computer nodes, consistent with an embodiment of the present invention.

Referring to FIG. 4, in certain embodiments, filtered latitude-longitude data 400 may be partitioned according to device ID and sent to a configurable number of computer nodes for processing. The platform may be completely scalable with respect to the number of device IDs.

Figure 5:
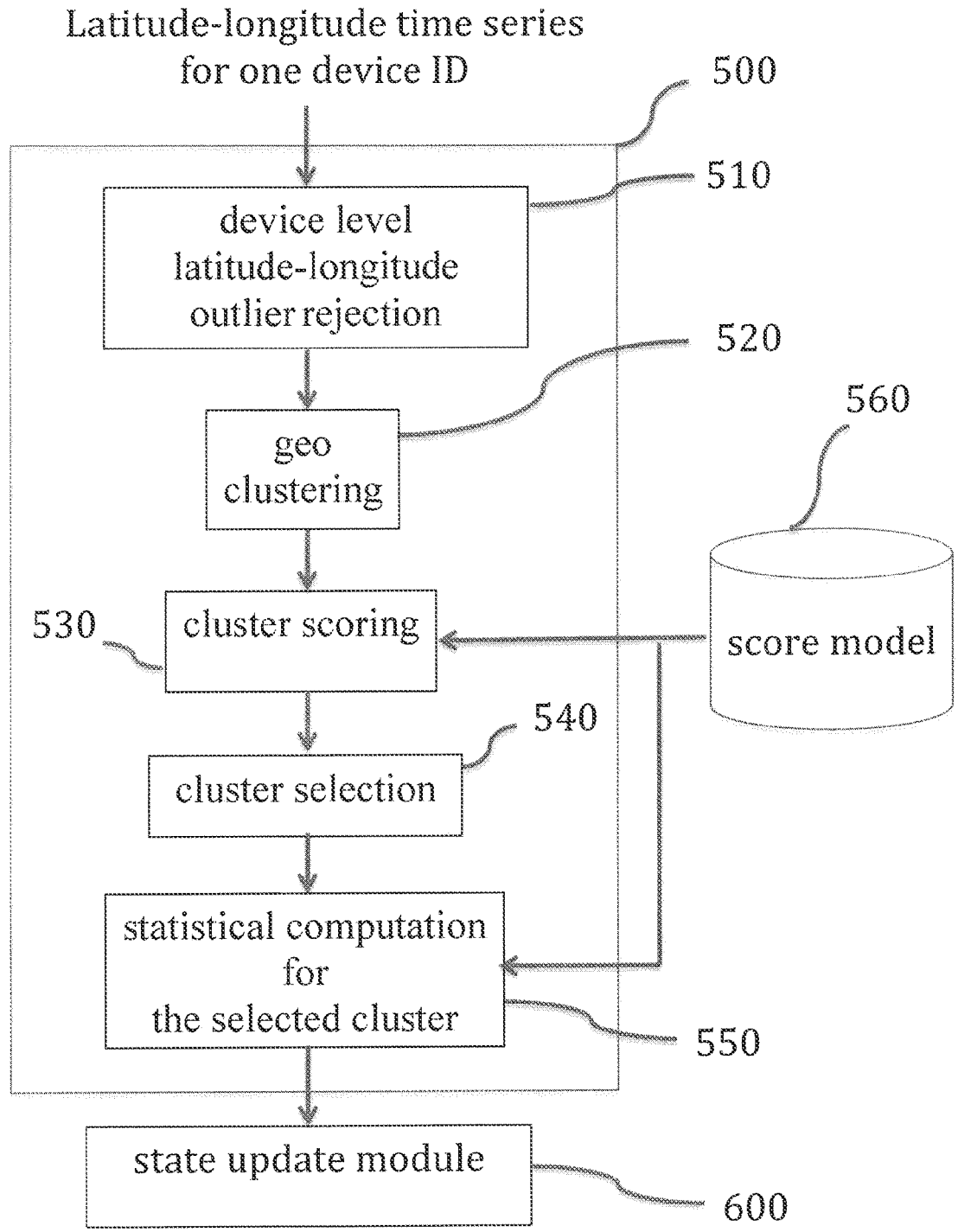
FIG. 5 is a schematic block diagram of a daily association module, in which information from one day is computed to obtain the optimal latitude-longitude pair at which the mobile device may reside, consistent with an embodiment of the present invention.

FIG. 5 shows a block diagram of a daily association module 500, in accordance with certain embodiments of the invention. For ease of discussion, the description in the following sections refers to only one device ID. This is without loss of generality, as device IDs can be processed independently or in parallel, as shown in FIG. 4.

The daily association module 500 generally makes use of time series from the most recent day. While it is called daily association module, it is apparent to people skilled in the art that the relevant time period or interval does not need to be one day. For example, the time interval can be 12 hours, one week, one month, or one year. The time interval, also referred to herein as the sampling period, is chosen to be one day in the discussion that follows.

Figure 6:
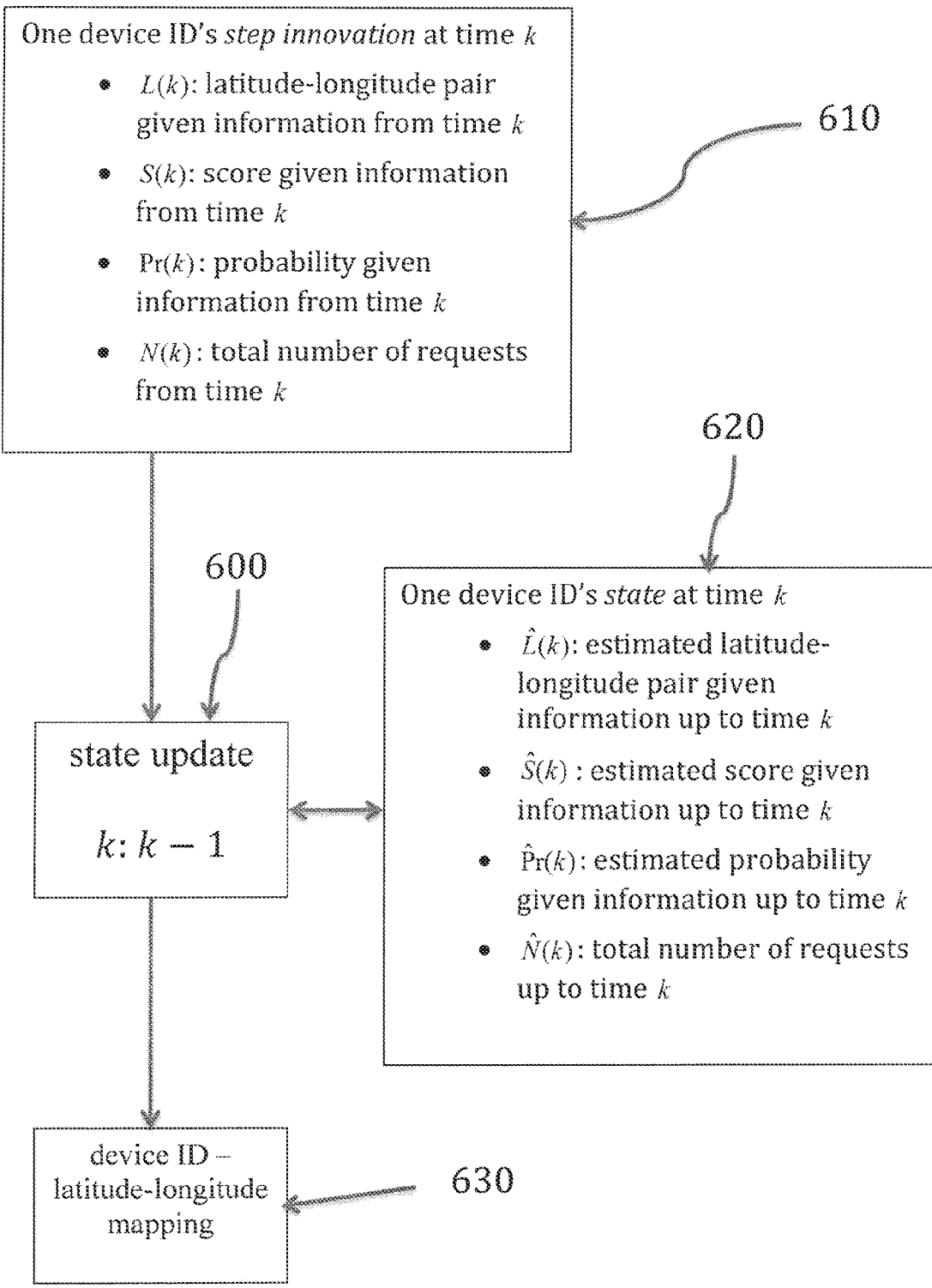
FIG. 6 is a schematic block diagram of a state update unit, in which information from one day to the next is recursively processed to generate an optimal latitude-longitude pair near which the mobile device may reside, consistent with an embodiment of the present invention.

As shown in FIG. 5, the daily association module 500 includes: (1) a device-level latitude-longitude outlier rejection unit 510; (2) a geo-clustering unit 520; (3) a cluster scoring unit 530; (4) a cluster selection unit 540; and (5) a statistical computation unit 550. The output from the daily association module 500 is fed into a state update module 600, which is also shown in FIG. 6. A score model 560 includes one or more models that reflect a relative importance of the latitude-longitude pair for each request, based on features such as time of the day. The score model 560 provides input to the cluster scoring unit 530 and the statistical computation unit 550. The units 510 through 550 are described in detail below.

The process and computation in all units in FIG. 5 use information from one day, e.g., the $k^{th}$ day. For the sake of notational brevity, the time index k is not explicitly shown in the immediate discussion that follows. The time index k will be explicitly shown in the discussion of FIG. 6, below.

In FIG. 5, the device-level outlier rejection unit 510 checks the time series of latitude-longitude against a set of physical constraints, such as speed constraints. For example, given two consecutive time-location pairs, $(t_1, L_1)$ and $(t_2, L_2)$, if the latitude-longitude pairs $L_1$ and $L_2$ are sufficiently far apart so that their difference is not likely to be caused by location measurement errors, a speed metric can be derived by computing $$v(t_2) = \frac{d(L_1, L_2)}{t_2 - t_1}$$

where d( ) is the great-circle distance function for two latitude-longitude pairs on the Earth surface. The speed defined hereby shall be considered as the lower limit of the true speed of the mobile device because the mobile device may not follow the great-circle path. If the speed defined hereby is larger than a certain threshold, it is almost certain that at least one of the latitude-longitude pairs is erroneous, and, in that case, the outlier rejection unit 510 may reject one or both of the ad requests. While the outlier rejection unit 510 excludes erroneous latitude-longitude pairs, one skilled in the art will recognize that a continuous score can be computed for each latitude-longitude instead of binary inclusion/exclusion. Such score can be used to weigh the importance of the request based on latitude-longitude reliability. In some embodiments, a latitude-longitude pair may be flagged as erroneous and retained, rather than excluded or deleted.

Figure 11:
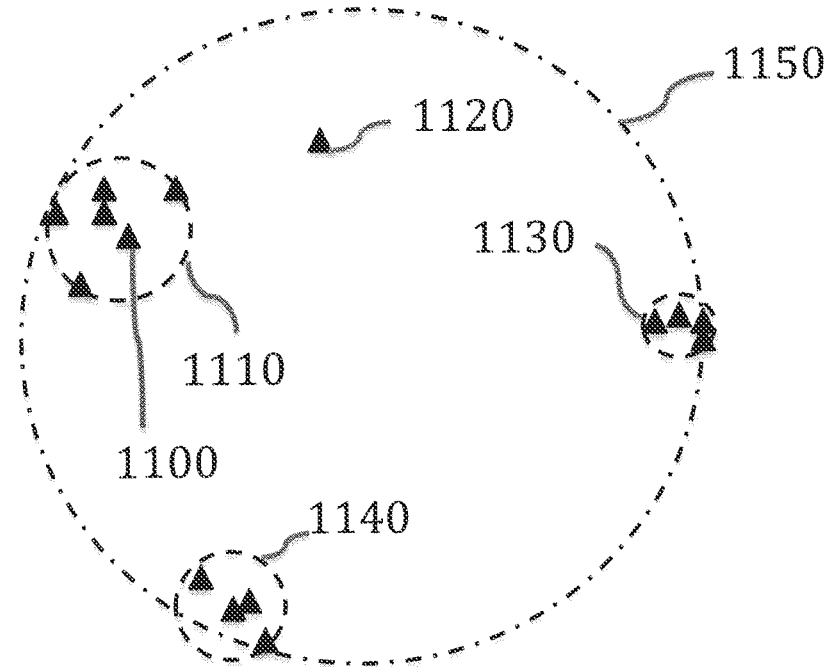
FIG. 11 is a schematic diagram showing a group of clusters for a collection of latitude-longitude pairs for a mobile device, consistent with an embodiment of the present invention.

In the geo clustering unit 520, classification methods are applied to partition latitude-longitude pairs into an appropriate number of clusters according to their geographical proximities. The result of clustering is illustrated in FIG. 11 where each triangle 1100 represents a distinct location for a mobile device during a time period (e.g., one day), and four clusters 1110, 1120, 1130, 1140 are created around the triangles 1100. In general, due to inaccuracies associated with measuring the location of the mobile device, the latitude-longitude pairs and corresponding clusters represent apparent or plausible locations (i.e., not necessarily accurate locations) visited by the mobile device during the time period. A cluster may correspond to latitude-longitude pairs at or around the home, those at or around a workplace, those on the road, and many others. With the assumption that a device has up to one household location, the geo-clustering process is a critical step to reduce the household association problem complexity so that in later steps only one cluster of latitude-longitude pairs needs to be considered. The "size" of a cluster c may be measured by a radius r of a smallest circle that covers a group of latitude-longitude pairs, as illustrated by the circular clusters 1110, 1130, 1140. In the depicted embodiment, cluster 1120 has only one distinct latitude-longitude pair (indicated by a single triangle 1100), and its corresponding radius is zero. The "size" R(C) of any particular set of clusters C may be defined as a maximum size of all the clusters within the set C, i.e., $$R(C) = \max_{c \in C} r(c).$$

Given any number M of distinct latitude-longitude pairs, one may partition them into any m number of clusters, where $1 \leq m \leq M$. In some embodiments, one may use the k-nearest neighbors algorithm (KNN) to find an optimal partition or set of clusters C such that the size of the partition R(C) is minimized. To emphasize the relationship between the number of clusters and the size of the optimal partition, we denote the size of the optimal partition as R(m) instead of R(C), with the understanding that the set of clusters C has m clusters. It is apparent that R(m) is smaller for larger values of m. It is also evident that R(1) is the radius of a minimum covering circle 1150 of all M latitude-longitude pairs. Further, R(M) (i.e., the maximum size of the clusters when each cluster includes a single latitude-longitude pair) is 0.

In various embodiments, the method adaptively chooses the minimum number of clusters, m, such that $$R(m) \leq \delta$$

where $\delta$ is a pre-specified threshold value. An exemplary value for $\delta$ is 50 meters. The choice of $\delta$ shall take into account factors such as average household lot size and uncertainties in latitude-longitude measurements. For those skilled in the art, it is evident that the choice of $\delta$ may vary for different geo locations. A bisection algorithm may be deployed to search for the minimum number of clusters, $1 \leq m \leq M$, and the corresponding clustering results are passed to the next step.

In the cluster scoring unit 530, each candidate geographical cluster is scored according to a likelihood that the mobile device is from a household within the candidate cluster. A score S is based on features that include the number of requests, the time of each request, and the latitude-longitude's proximity to a household location. The score S for a cluster c is computed according to $$S(c) = \sum_{i \in \{j : L_j \in c\}} w_1(t_i) w_2(L_i)$$

where $w_1(t_i)$ is a weight for time $t_i$, $w_2(L_i)$ is a weight from location $L_i$, and the summation is taken over all time-location pairs within the cluster c. The weight functions $w_1(t_i)$ and $w_2(L_i)$ are from the score model 560 and are scaled such that $0 \leq w_1(t_i) \leq 1$ and $0 \leq w_2(L_i) \leq 1$. General human population behavioral patterns are modeled to determine a likelihood that a device bearer is at a residential location. For example, the household address for many device bearers corresponds to the location of their mobile device in the evening or at night. The weight functions may be obtained from logistic regression of a training data set, in which a set of test mobile devices with known household location provide streaming data, and logistic models are fitted to approximate the functions $w_1(\ )$ and $w_2(\ )$. For example, $w_1(t_i)$ may be larger when $t_i$ corresponds to the evening, because the device bearer is more likely at home during that time. Likewise, $w_2(L_i)$ may be larger when $L_i$ corresponds to a residential location, because the device bearer is more likely at home when the device is in such a location. Further, these weights may be lower when $t_i$ corresponds to the middle of the day, when many people are at work or otherwise away from home, or when $L_i$ corresponds to locations that are not residential (e.g., a highway, a train track, or a body of water, such as an ocean).

In the cluster selection unit 540, the geographical clusters are ranked according to the score S computed by unit 530, and each partition is assigned a probability of containing the home location for the device. The cluster with the highest score, $$c^* = \operatorname{argmax} S(c),$$

may be assigned to the device ID, and the corresponding highest score may be represented by $S(c^*)$. Note that this determination of the household location for the device is obtained from data obtained within a single day. A more accurate determination of the household address corresponding to the mobile address may be obtained through recursive computation using encoded information from earlier days. This recursive computation approach is discussed further, below, with respect to FIG. 6.

In the statistical computation unit 550, statistical properties about the association are computed, which will be fed into the state update module 600. The probability that the device ID is associate to the cluster with the highest score c*, given information from the day, is defined to be $$Pr(c^*) = \frac{S(c^*)}{\sum_c S(c)}$$

A weighted centroid L* is computed for the cluster with the highest score c*, using a weighted average against all requests within the cluster $$L^*(c^*) = \frac{\sum_{i \in c^*} w_1(t_i) w_2(L_i) L_i}{\sum_{i \in c^*} w_1(t_i) w_2(L_i)}$$

where $w_1(t_i)$ is the weight for time $t_i$ and $w_2(L_i)$ is the weight from location $L_i$, as described for the cluster scoring unit 530. In the equation above, $L_i$ includes both latitude and longitude, and the mathematical operation is performed on a vector of length 2. The number of ad requests originated from the cluster can be readily counted, and denoted as N(k).

Referring to FIG. 6, in the state update module 600, daily association results 610 are combined with state information 620 through recursive computation. The state information 620 encodes learning results up to the most recent day, and it is updated by the state update module 600 via a process called state update.

The daily association result 610 is the output from the daily association module 500, which includes L(k) (i.e., the latitude-longitude pair given information from time k), S(k) (i.e., the score core given information from time k), Pr(k) (i.e., the probability given information from time k), and N(k) (i.e., the total number of requests from time k). All four of these quantities are properties of the optimal cluster c* for the day. For brevity, c* will be dropped but the discrete time index k will be introduced to indicate different time instances. For example, when the sampling period is one day, k refers to the kth day. With such convention, L(k) replaces L*(c*), S(k) replaces S(c*), Pr(k) replaces Pr(c*), and N(k) replaces N(k), as shown in the daily association results 610 in FIG. 6.

The state information 620 (also referred to herein as "the state") contains four information fields, namely, estimated optimal latitude-longitude $\hat{L}(k)$, estimated score $\hat{S}(k)$, estimated probability $\hat{Pr}(k)$, and total number of requests $\hat{N}(k)$, for a device ID given information up to time k.

The time index k is essential to understanding the function of the state update unit 600, which computes the new state for time index k from the state for k−1, using daily association result for time k. The state information 620 shows the time index of k and it is understood that k is the time index for the updated state.

The recursive update of the quantities in state 620 takes into account whether the optimal latitude-longitude pair L(k) from day k (shown in 610) is consistent with the state variable $\hat{L}(k-1)$. Consistency may be defined by whether the great-circle distance between L(k) and $\hat{L}(k-1)$ is smaller than a certain threshold, i.e., $d(L(k), \hat{L}(k-1)) \leq \epsilon$, where $\epsilon$ is a configurable small distance in meters. When L(k) and $\hat{L}(k-1)$ are consistent, learning will be enforced and the association between the device and household will be stronger; otherwise, the association will be weaker or even changed altogether. For example, when a mobile device is repeatedly, day after day, brought to the same household location, L(k) and $\hat{L}(k-1)$ are likely to be consistent and within a small threshold distance $\epsilon$.

The various state variables are computed using a set of mathematical equations, depending on whether or not L(k) and $\hat{L}(k-1)$ are consistent. For example, when L(k) and $\hat{L}(k-1)$ are consistent, then $$\hat{L}(k) = \alpha_1 \hat{L}(k-1) + (1-\alpha_1) L(k)$$

$$\hat{S}(k) = \hat{S}(k-1) + S(k)$$

$$\hat{Pr}(k) = \alpha_2 \hat{Pr}(k-1) + (1-\alpha_2) Pr(k)$$

$$\hat{N}(k) = \hat{N}(k-1) + N(k)$$

where $\alpha_1$ and $\alpha_2$ are smoothing coefficients, with values between 0 and 1. If the sampling period is 1-day, these configurable coefficients may be set to be 0.95, such that previous values are weighted more heavily than the new values. This approach allows the household assignment $\hat{L}(k)$ for the mobile device to be repeatedly fine-tuned over time, as more data is collected. Alternatively, when L(k) and $\hat{L}(k-1)$ are not consistent, two scenarios are considered, depending on whether or not the score S(k) is larger than $\hat{S}(k-1)$. If $S(k) \leq \hat{S}(k-1)$, the household assignment $\hat{L}(k)$ may remain the same. Otherwise, if $S(k) > \hat{S}(k-1)$, the household assignment $\hat{L}(k)$ may change to a location of a different cluster. Mathematically, in certain embodiments, $$\hat{L}(k) = \begin{cases} \hat{L}(k-1) & \text{if } \hat{S}(K-1) \geq S(k) \\ L(k) & \text{otherwise} \end{cases}$$

$$\hat{S}(k) = \begin{cases} \hat{S}(k-1) - S(k) & \text{if } S(k) \leq \hat{S}(k-1) \\ S(k) & \text{otherwise} \end{cases}$$

$$\hat{Pr}(k) = \begin{cases} \hat{Pr}(k-1) & \text{if } S(k) \leq \hat{S}(k-1) \\ Pr(k) & \text{otherwise} \end{cases}$$

$$\hat{N}(k) = \begin{cases} \hat{N}(k-1) & \text{if } S(k) \leq \hat{S}(k-1) \\ N(k) & \text{otherwise} \end{cases}$$

Advantageously, by using the state update unit 600 in this manner, the household assignment $\hat{L}(k)$ for the mobile device is repeatedly being learned, fine-tuned, and adjusted, as more information is collected over time. In various embodiments, the state update unit 600 is able to recognize and ignore new information that is incorrect. The state update unit 600 may output a copy of the state to the next stage, i.e., a maximum likelihood estimator 710 of latitude-longitude to household ID.

Figure 7:
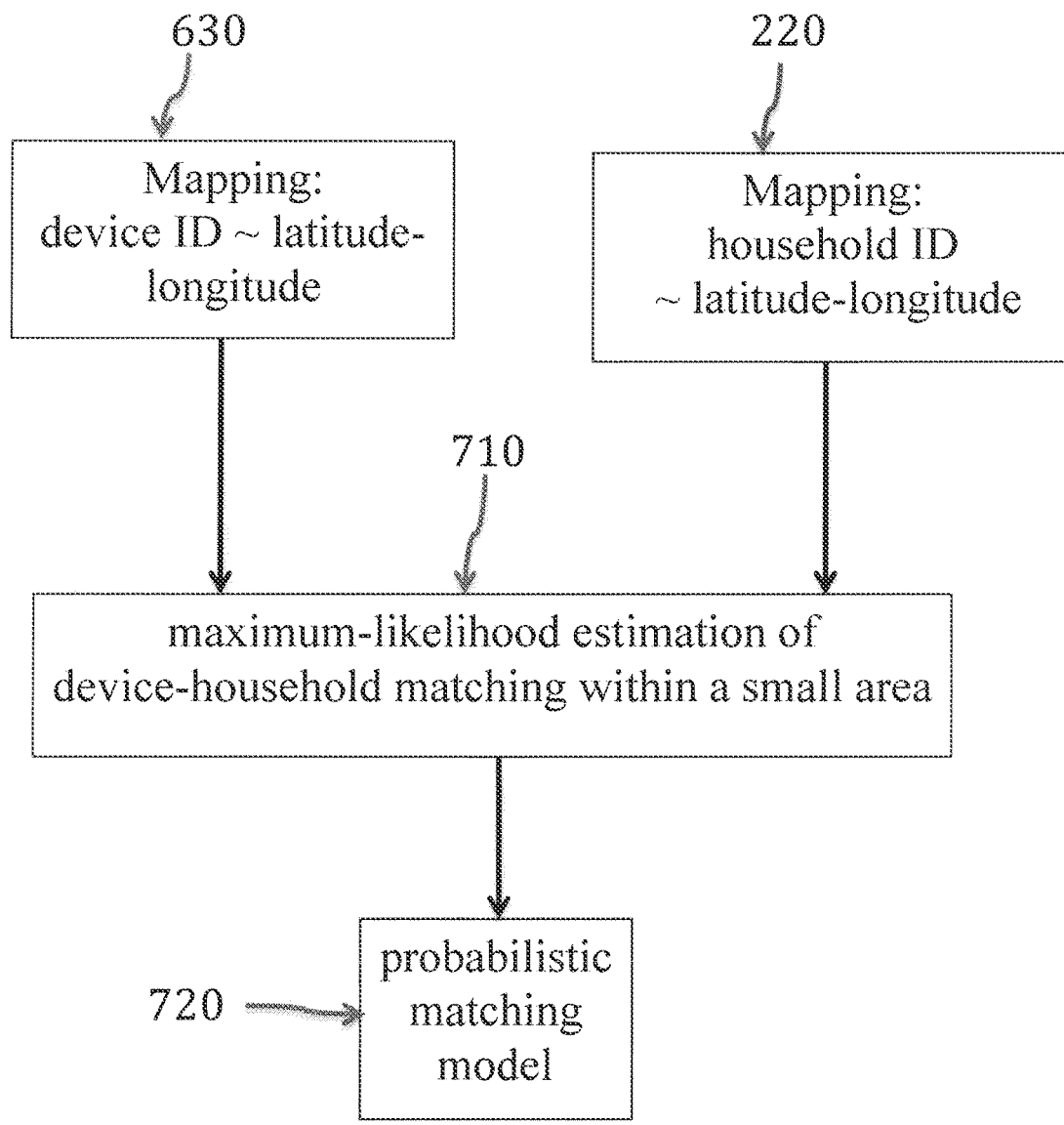
FIG. 7 is a schematic block diagram of association from a latitude-longitude pair to a household ID, consistent with an embodiment of the present invention.

FIG. 7 is a schematic diagram showing the maximum likelihood estimator 710 for latitude-longitude to household ID mapping. One input into the estimator 710 is a mapping from device ID to latitude-longitude 630, generated by the state update unit 600. The other input is the mapping from household ID to longitude-latitude 220. As mentioned, the longitude-latitude pair in 630 may be the estimated weighted centroid of a cluster of latitude-longitude pairs that the mobile device reported. There may be multiple households near the cluster of latitude-longitude pairs.

Under the assumption that the latitude-longitude pairs follow 2-dimensional normal distribution around the device's true location, it may be shown mathematically that the household closest to the centroid $\hat{L}(k)$ is the household that is most likely associated to the mobile device. Accordingly, the maximum likelihood estimator 710 may identify the household ID having a latitude-longitude closest to the weighted centroid, as being the household location for the mobile device, e.g., in mapping 630.

Figure 8:
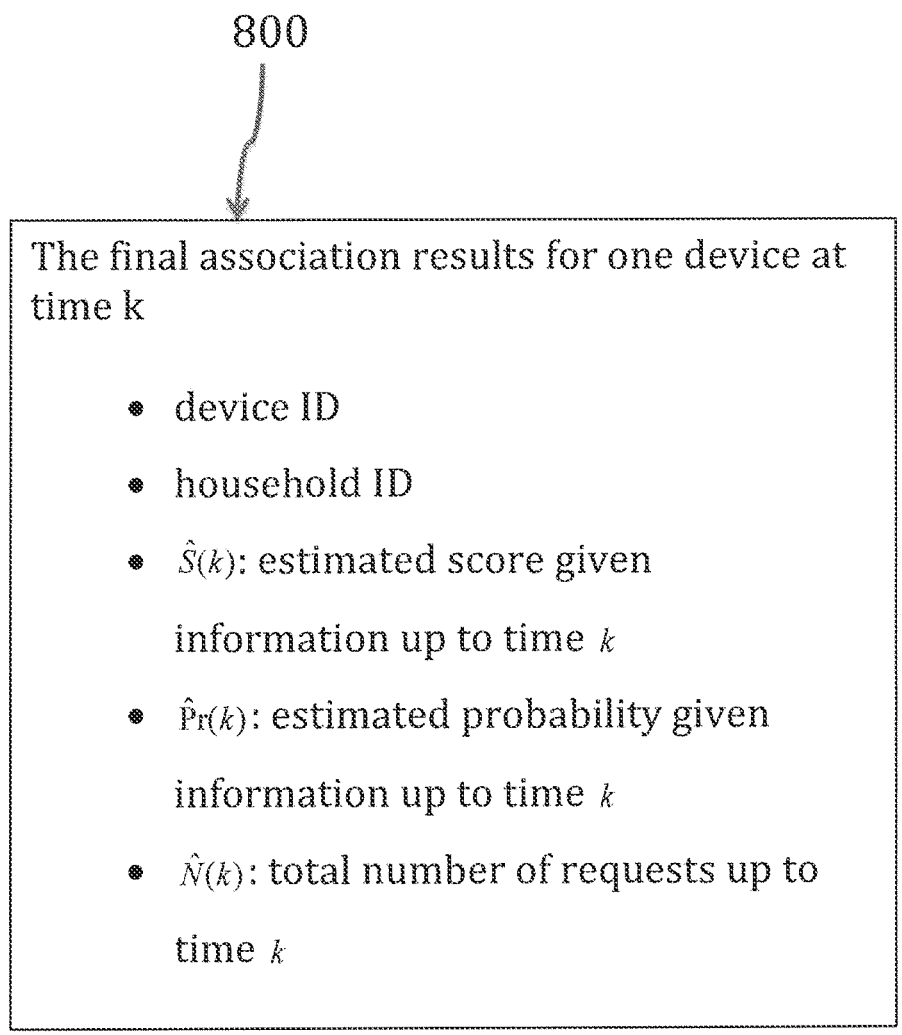
FIG. 8 is a schematic diagram showing exemplary final household association results for a mobile device, consistent with an embodiment of the present invention.

FIG. 8 shows a typical record 800 of the final association results for a mobile device, up to the current time k. The record 800 includes: (1) device ID; (2) matched household ID; (3) estimated score $\hat{S}(k)$; (4) estimated probability $\hat{Pr}(k)$; and (5) total number of ad requests $\hat{N}(k)$. The last three items in the record 800 (i.e., the estimated score $\hat{S}(k)$, the estimated probability $\hat{Pr}(k)$, and the total number of requests $\hat{N}(k)$) provide an indication of a fitness of the association. Generally, higher values of these three metrics mean the association between the device ID and the household ID has a higher confidence.

It is understood that the association results for a device may evolve as more streaming data is received. In general, the association results will be enforced as more evidence is obtained. It is possible, however, that certain device IDs show oscillatory association behavior, e.g., for people who travel or move between two or more locations in a certain specific manner. It is also understood that a device ID may be associated with multiple household IDs, e.g., because multiple household IDs may be geocoded to the same latitude-longitude pair, as in the module 220.

Figure 9:
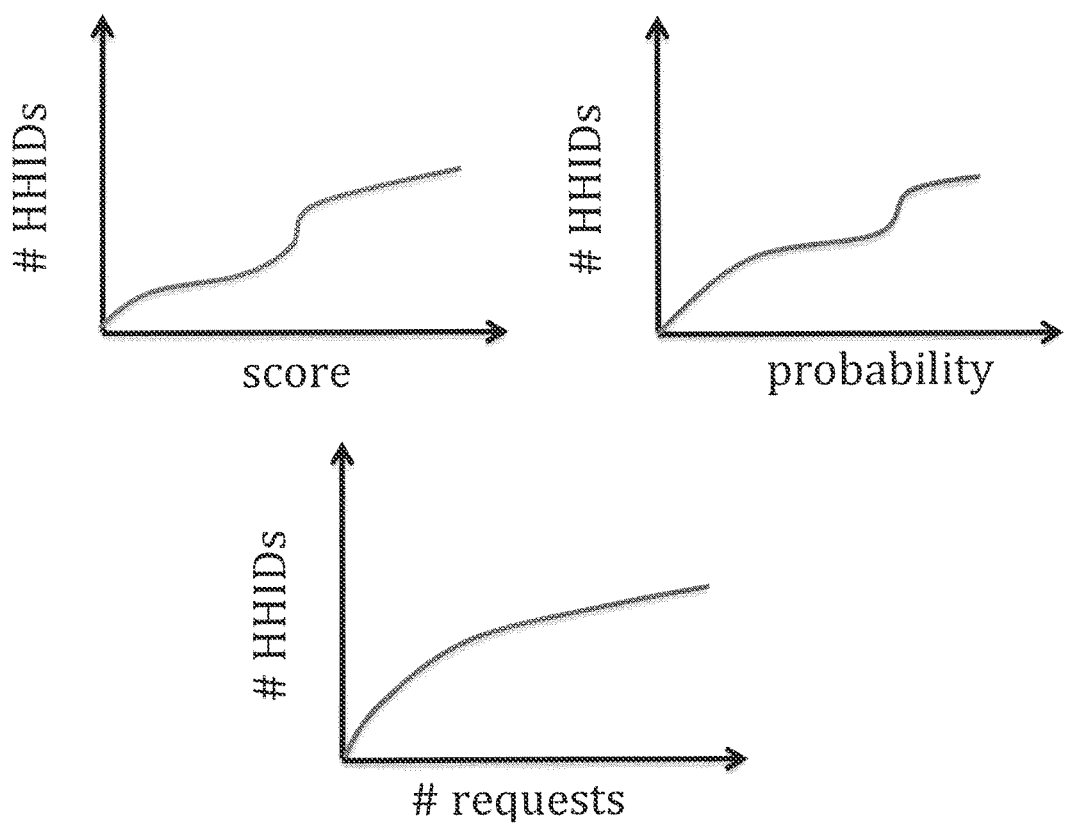
FIG. 9 includes exemplary, schematic plots of statistical metrics versus a total number of household IDs that an advertisement campaign is likely able to reach, consistent with an embodiment of the present invention.

FIG. 9 shows exemplary plots of statistical metrics versus the total number of household IDs an advertisement campaign is likely able to reach. In general, statistical metrics attached to the device ID—household ID association may enhance the ad targeting methods discussed above and depicted in FIG. 1. For example, an advertisement campaign may be targeted at a list of desirable household IDs having a score of at least 10. The methods and systems described herein allow such statistically better associated households to be efficiently targeted, while still meeting the campaign's desired size of the campaign. For those skilled in the art, the 1-dimensional relationships in this figure can be easily extended to high-dimension in which multiple statistical metrics are taken into account, e.g., a score of at least 10 and probability of at least 0.6.

In certain embodiments, the methods and systems described herein are used to classify one device's latitude-longitude pairs into two classes according to the likelihood of being a device true location (e.g., a location of the user's household). The methods and systems may utilize recursive computations to satisfy reasonable physical conditions.

In various embodiments, the methods and systems cluster a mobile device's geographical data and automatically partition it into potential geo areas, one of which may contain the user's household. The methods and systems preferably include or utilize a computer program that automatically selects an optimal number of partitions (e.g., between one and a total number of unique latitude-longitude pairs). The computer program may ensure that a number of computational iterations required to obtain an optimal number of partitions is proportional to a logarithm of the total number of unique latitude-longitude pairs.

In some implementations, the methods and systems evaluate each geo area's likelihood of containing the household where the user of the mobile device resides. The computer program may accept user location and behavioral data from the geo partition. The computer program may then compute a score based on such data, using features such as time of the request, number of requests, and any apps and/or websites from which the ad requests are obtained.

The methods and systems may be used to select one geo partition or cluster that is the most likely partition that contains the user's household, among all the partitions. The methods and systems may then identify the particular household within the partition or cluster that is most likely the user's household, among all the households in the partition. The mobile device may then be associated with the identified household (e.g., using a device ID number and a household ID number).

In certain embodiments, the methods and systems recursively update or fine-tune the device to household association based on additional latitude-longitude data received from the mobile device, over time. Statistical metrics (e.g., a score and/or a probability) may be updated accordingly to reflect the quality of the device to household association. A household ID may be selected for the mobile device, based on a fitness of the association. A relationship between the number of household IDs and the given fitness requirements may be established.

It is understood that the methods and systems described herein may contain software and hardware connected to the Internet via a network. Computing devices are capable of communicating with each other via the Internet, and it should be appreciated that the various functionalities of the components may be implemented on any number of devices.

Figure 10:
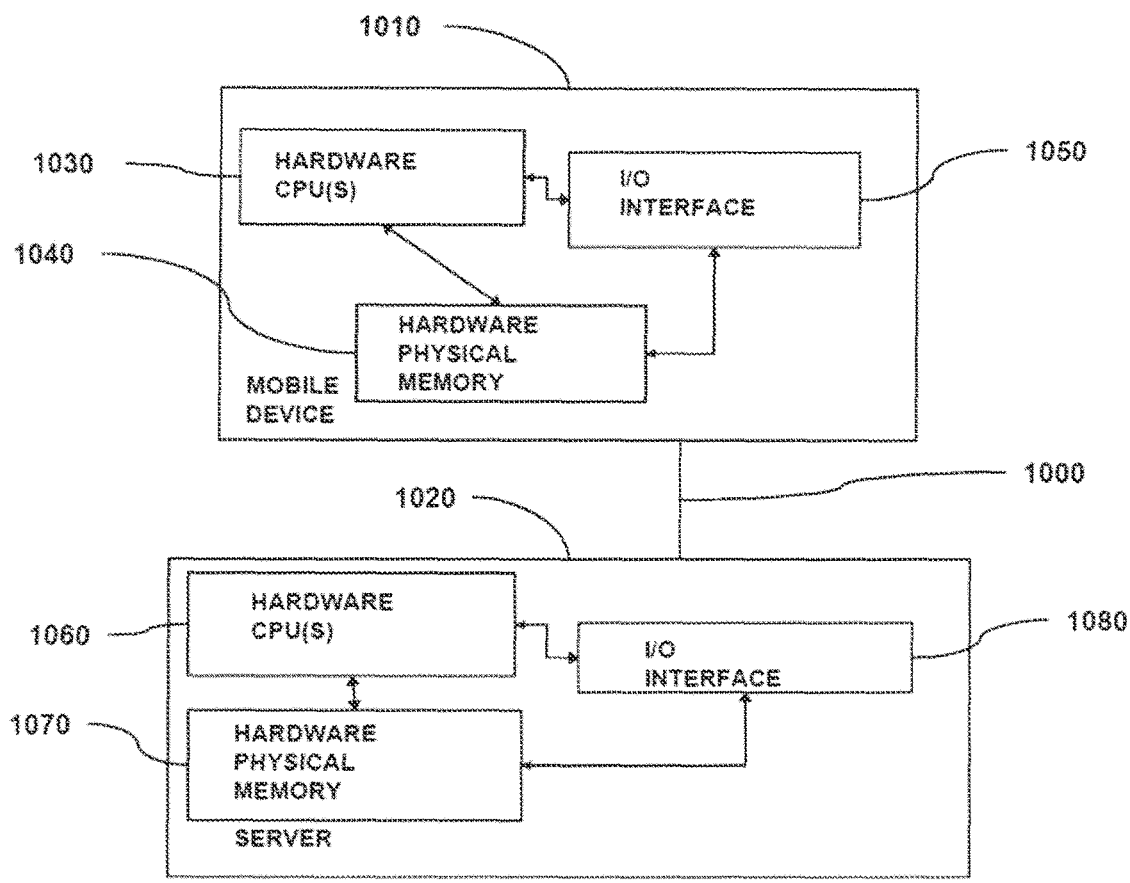
FIG. 10 a schematic diagram of a system for associating a mobile device with a household, consistent with an embodiment of the present invention.

Referring to FIG. 10, a communications network 1000 generally connects the mobile device 1010 with a server 1020, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, etc.), and so on. Preferably, the network can carry TCP/IP protocol communications, and HTTP/HTTPS requests made by a web browser and the connection may be made between the peers and communicated over such TCP/IP networks.

The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet, which may accommodate many different communications media and protocols.

Mobile device 1010 and server(s) 1020 may be implemented in any suitable way. FIG. 10 illustrates an exemplary architecture for a mobile device 1010 and a server 1020 that may be used in some embodiments. The mobile device 1000 may include hardware central processing unit(s) (CPU) 1030, operatively connected to hardware/physical memory 1040 and input/output (I/O) interface 1050. Exemplary server 1020 similarly comprises hardware CPU(s) 1060 operatively connected to hardware/physical memory 1070 and input/output (I/O) interface 1080. Hardware/physical memory may include volatile and/or non-volatile memory. The memory may store one or more instructions to program the CPU to perform any of the functions described herein. The memory may also store one or more application programs.

Exemplary mobile device 1010 and exemplary server 1020 may have one or more input and output devices. These devices can be used, among other things, to present a user interface and/or communicate (e.g., via a network) with other devices or computers. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the services and consumers utilizing the service. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, or another operating system of platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

What is claimed is:

1. A method of estimating a household location of a user from signals transmitted by a mobile device owned by the user, the mobile device and the household location each having a unique identifier, method comprising:
    receiving a multiplicity of data signals from the mobile device over time;
    modeling the data signals into at least one time-series of latitude-longitude pairs;
    clustering each the latitude-longitude pairs into one of a number of clusters;
    calculating a score for each cluster; and
    identifying the user's household location by comparing the cluster scores.

2. The method of claim 1, wherein the data signals are associated with a time series of device locations.

3. The method of claim 2, wherein the data signals are associated with a time series of advertisement requests.

4. The method of claim 1, wherein the data signals comprise a latitude-longitude 2-tuple.

5. The method of claim 4, wherein data signals further comprise a timestamp at which a location measurement is taken.

6. The method of claim 1 further comprising performing outlier rejection by comparing the at least one time-series of latitude-longitude pairs against a set of physical constraints.

7. The method of claim 1, wherein clustering the latitude-longitude pairs into a number of clusters is based on geographical proximity over time.

8. The method of claim 1 further comprising associating the mobile device's unique identifier with the unique identifier of the identified user's household location.

9. The method of claim 1, wherein calculating a score for each cluster includes basing the score, at least in part, on at least one of a number of location measurements, a local time of occurrence of each location measurement, and a proximity of a centroid of the cluster to the household location.

10. The method of claim 9, wherein calculating a score for each cluster further comprises taking into account at least one of a total number of location measurements for a pre-determined period of time and a likelihood that the cluster corresponds to the user's household location for the pre-determined period of time.

11. The method of claim 9, wherein the location measurements refer to advertisement requests that include taking into account each application or Website from which the advertisement request is obtained.

12. A system for estimating a household location of a user from signals transmitted by a mobile device owned by the user, the mobile device and the household location each having a unique identifier, the system comprising:
- a geo-cluster unit structured and arranged to receive a multiplicity of data signals from the mobile device over time, model the data signals into at least one time-series of latitude-longitude pairs, and to cluster each of the latitude-longitude pairs into one of a number of clusters;
- a cluster scoring unit structured and arranged to calculate a score for each cluster; and
- a cluster selection unit structured and arranged to identify the user's household location by comparing the cluster scores.

13. The system of claim 12, wherein the cluster scoring unit is structured and arranged to base the score, at least in part, on at least one of a number of location measurements, a local time of occurrence of each location measurement, and a proximity of a centroid of the cluster to the household location.

14. The system of claim 12 further comprising a statistical scoring unit structured and arranged to account for at least one of a total number of location measurements for a pre-determined period of time and a likelihood that the cluster corresponds to the user's household location for the pre-determined period of time.

15. The system of claim 12 further comprising a latitude-longitude outlier rejection unit structured and arranged to perform outlier rejection by checking the at least one time-series of latitude-longitude pairs against a set of physical constraints.

16. A computer program product embodied on a non-transitory computer-readable medium and comprising computer code for estimating a household location of a user from signals transmitted by a mobile device owned by the user, the mobile device and the household location each having a unique identifier, the code comprising instructions stored in a data storage medium and executable on a processing device; and, when executed by the processing device, the processing device:
- receives a multiplicity of data signals from the mobile device over time;
- models the data signals into at least one time-series of latitude-longitude pairs;
- clusters each the latitude-longitude pairs into one of a number of clusters;
- calculates a score for each cluster; and
- identifies the user's household location by comparing the cluster scores.

17. The computer program product claim 16 further comprising code comprising instructions for performing outlier rejection by checking the at least one time-series of latitude-longitude pairs against a set of physical constraints.

18. The computer program product of claim 16 wherein clustering the latitude-longitude pairs into a number of clusters is based on geographical proximity over time.

19. The computer program product of claim 16 further comprising code comprising instructions for associating the mobile device's unique identifier with the unique identifier of the identified user's household location.

20. The computer program product of claim 16, wherein code instructions for calculating a score for each cluster include basing the score, at least in part, on at least one of a number of location measurements, a local time of occurrence of each location measurement, and a proximity of a centroid of the cluster to the household location.

21. The computer program product of claim 20, wherein code instructions for calculating a score for each cluster further include at least one of accounting for a total number of location measurements for a pre-determined period of time and a likelihood that the cluster corresponds to the user's household location for the pre-determined period of time.

22. The computer program product of claim 20, wherein the location measurements refers to advertisement requests that include taking into account each application or Website from which the advertisement request is obtained.

* * * * *